UNITED STATES PATENT OFFICE.

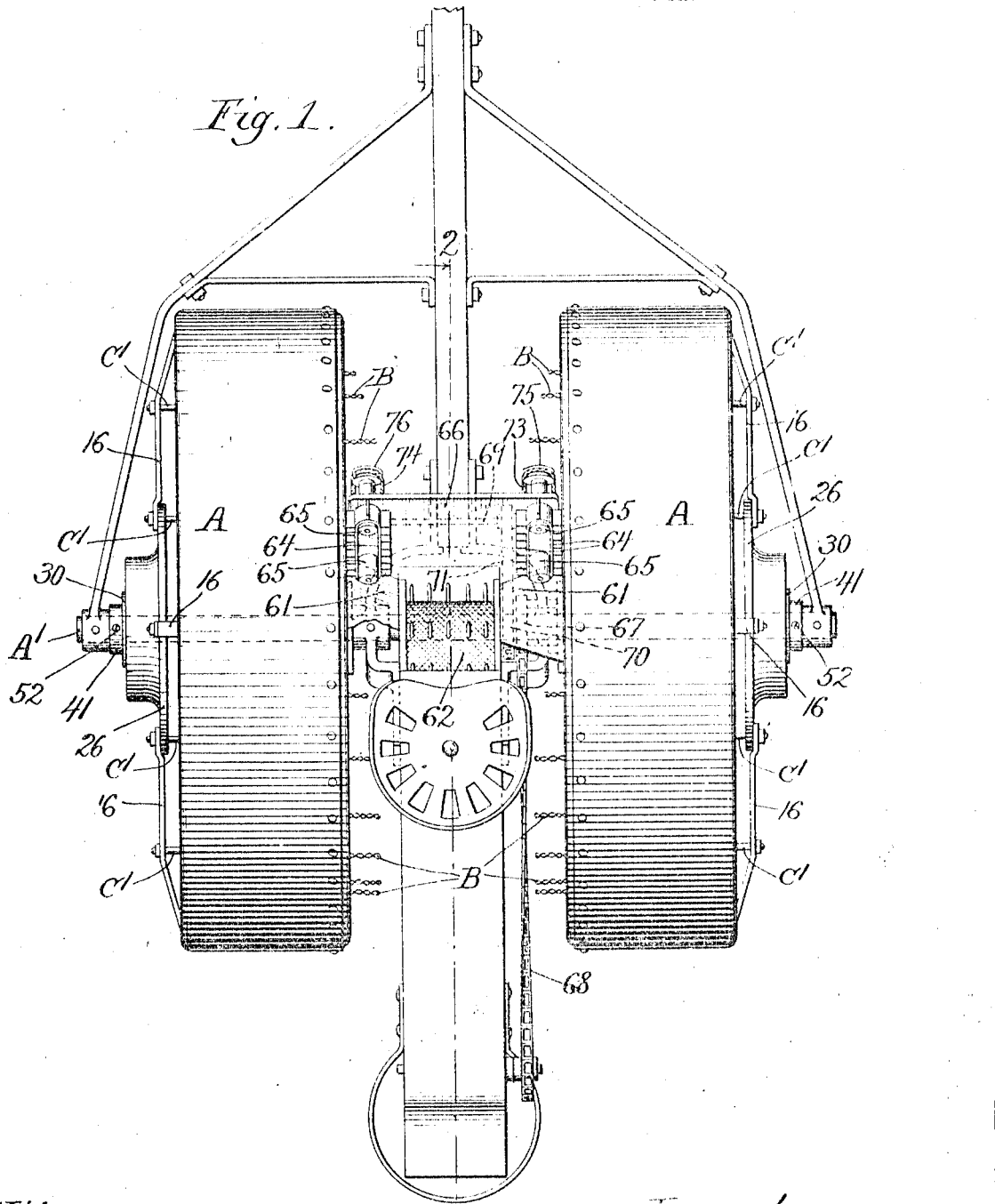

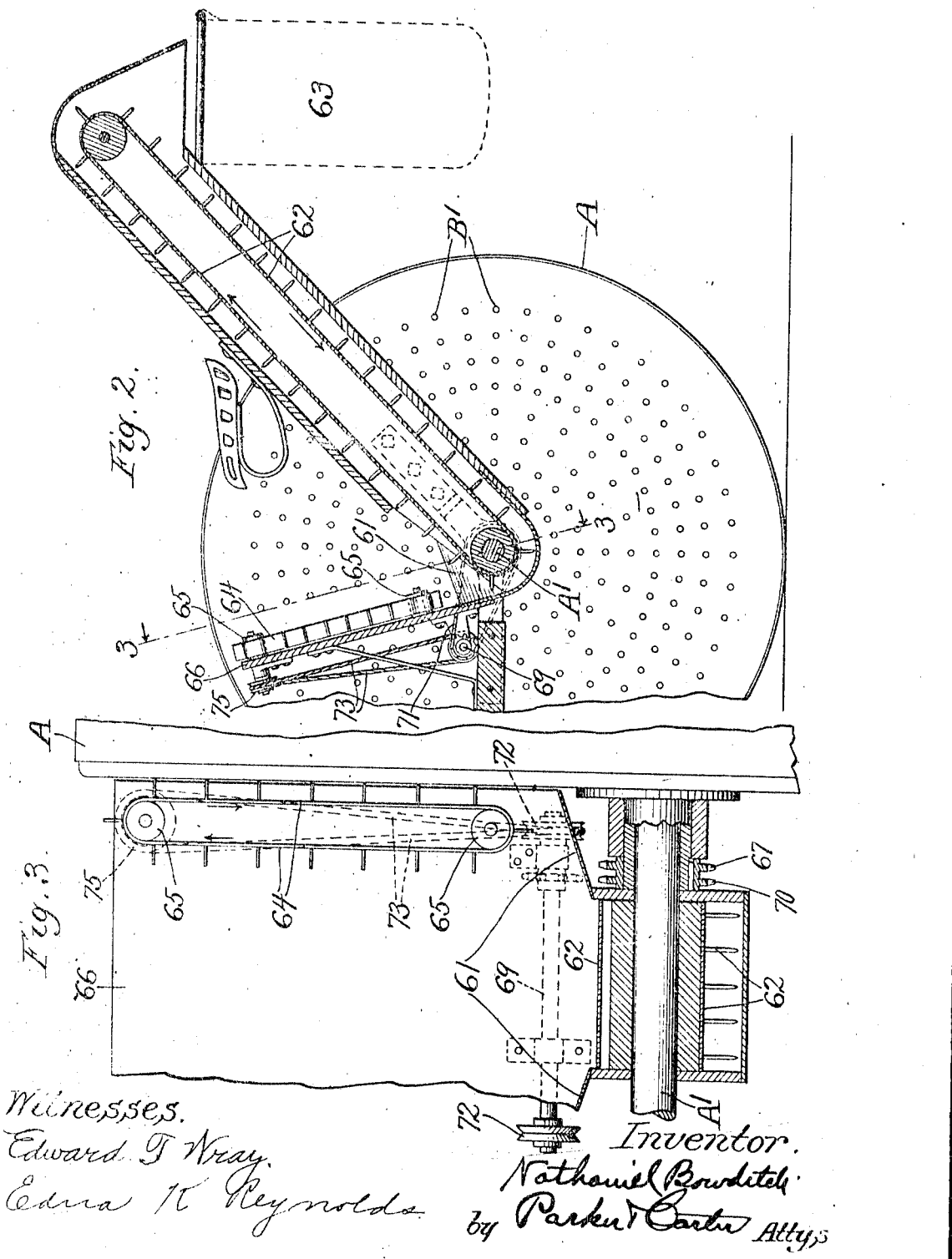

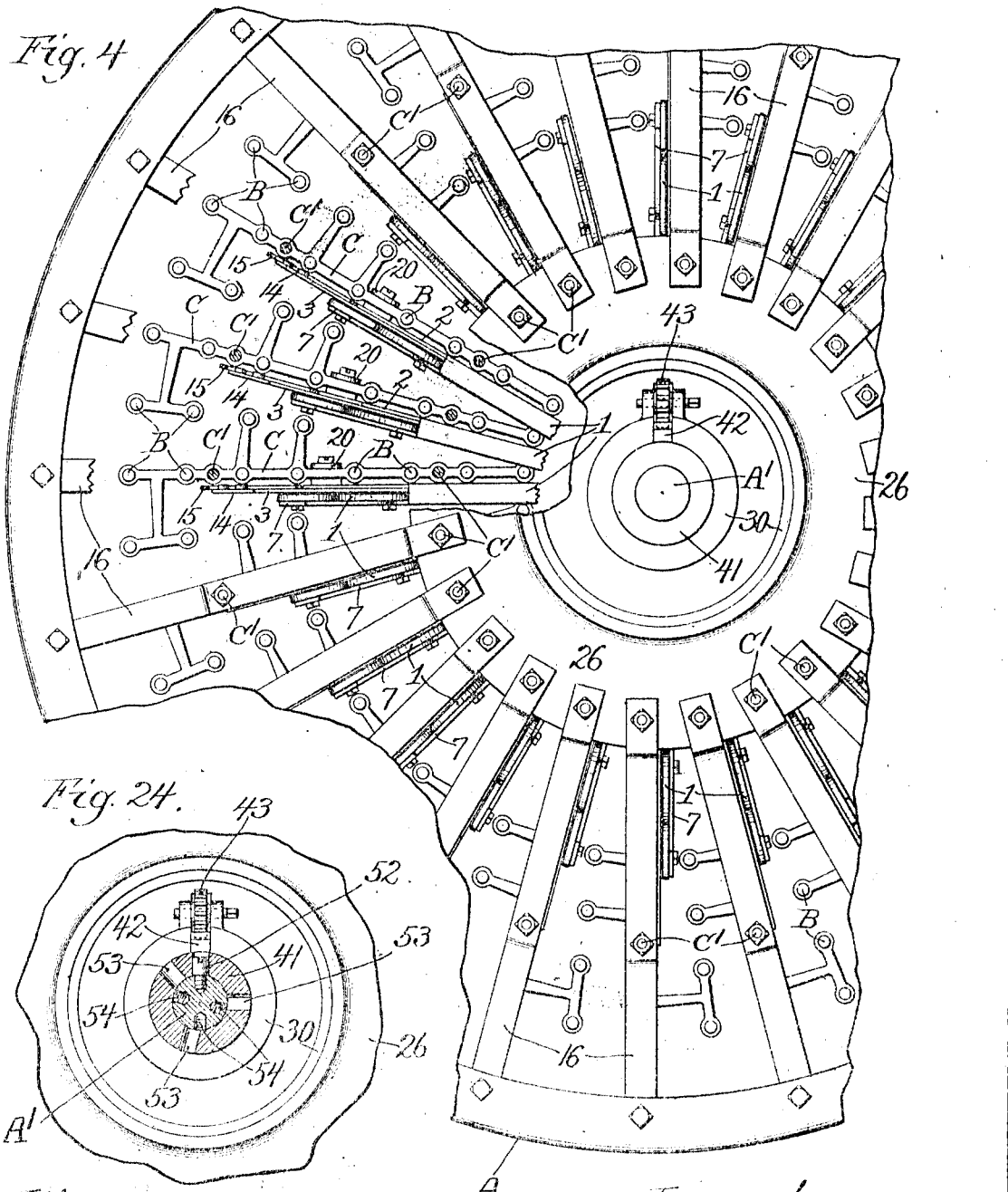

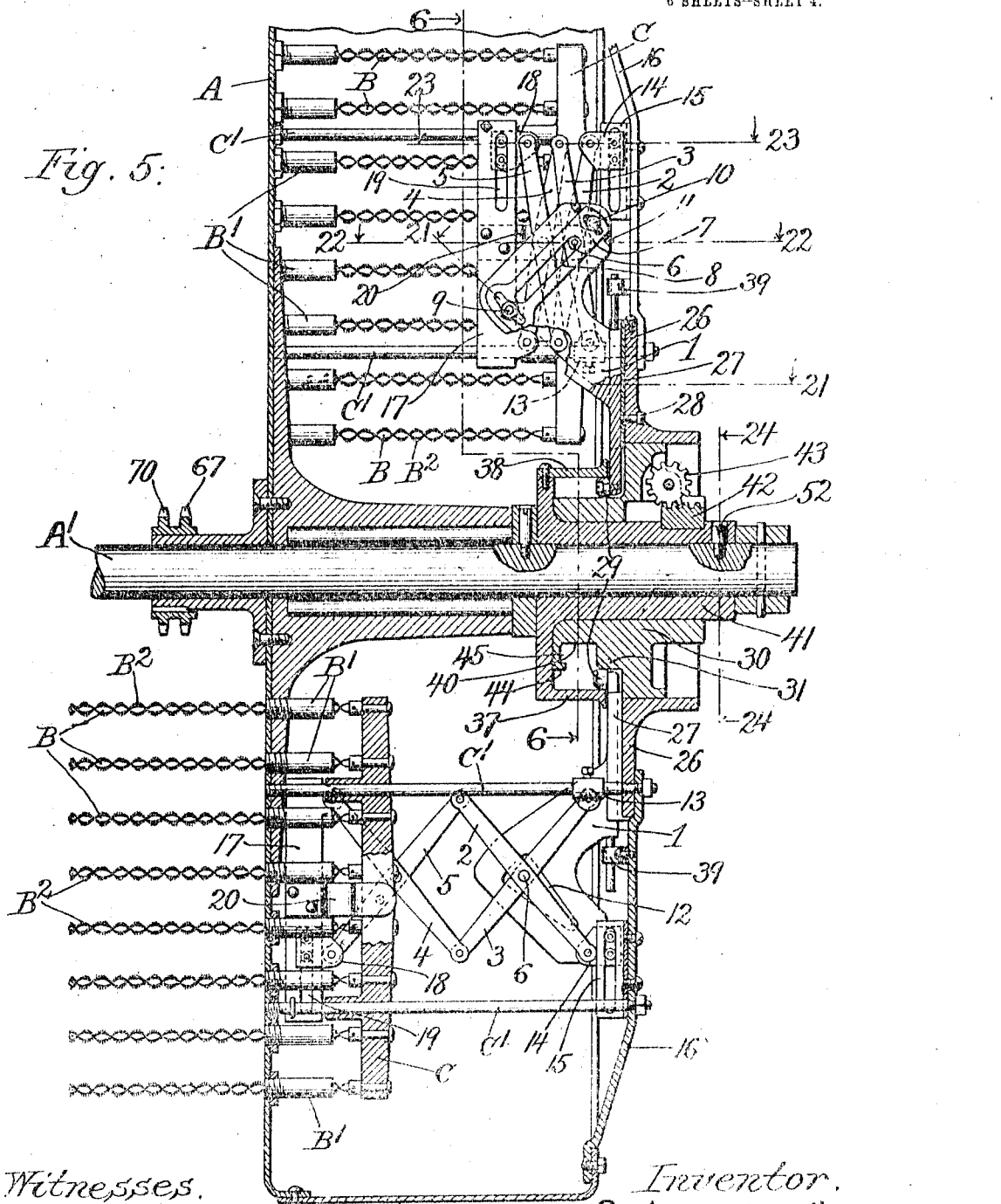

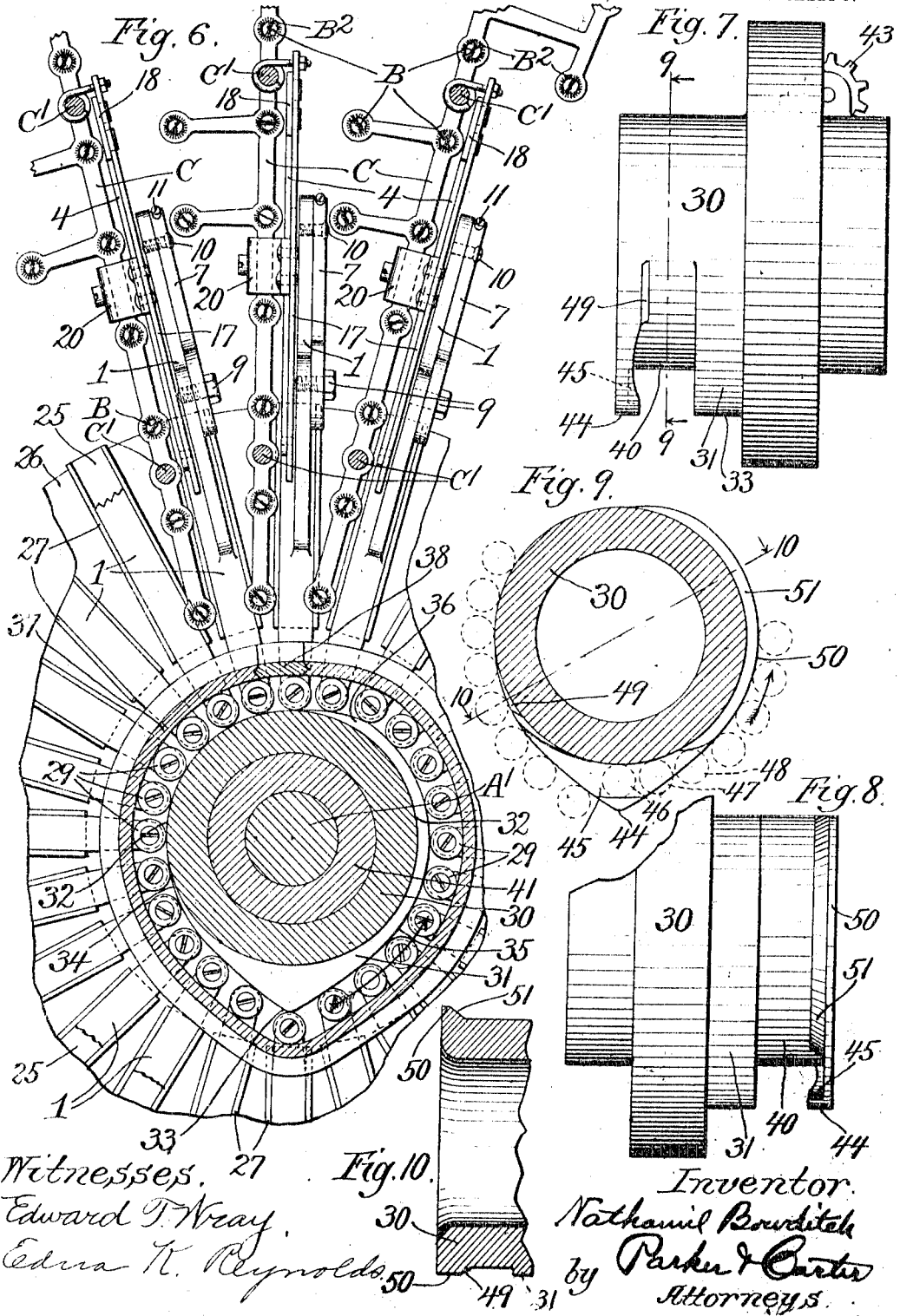

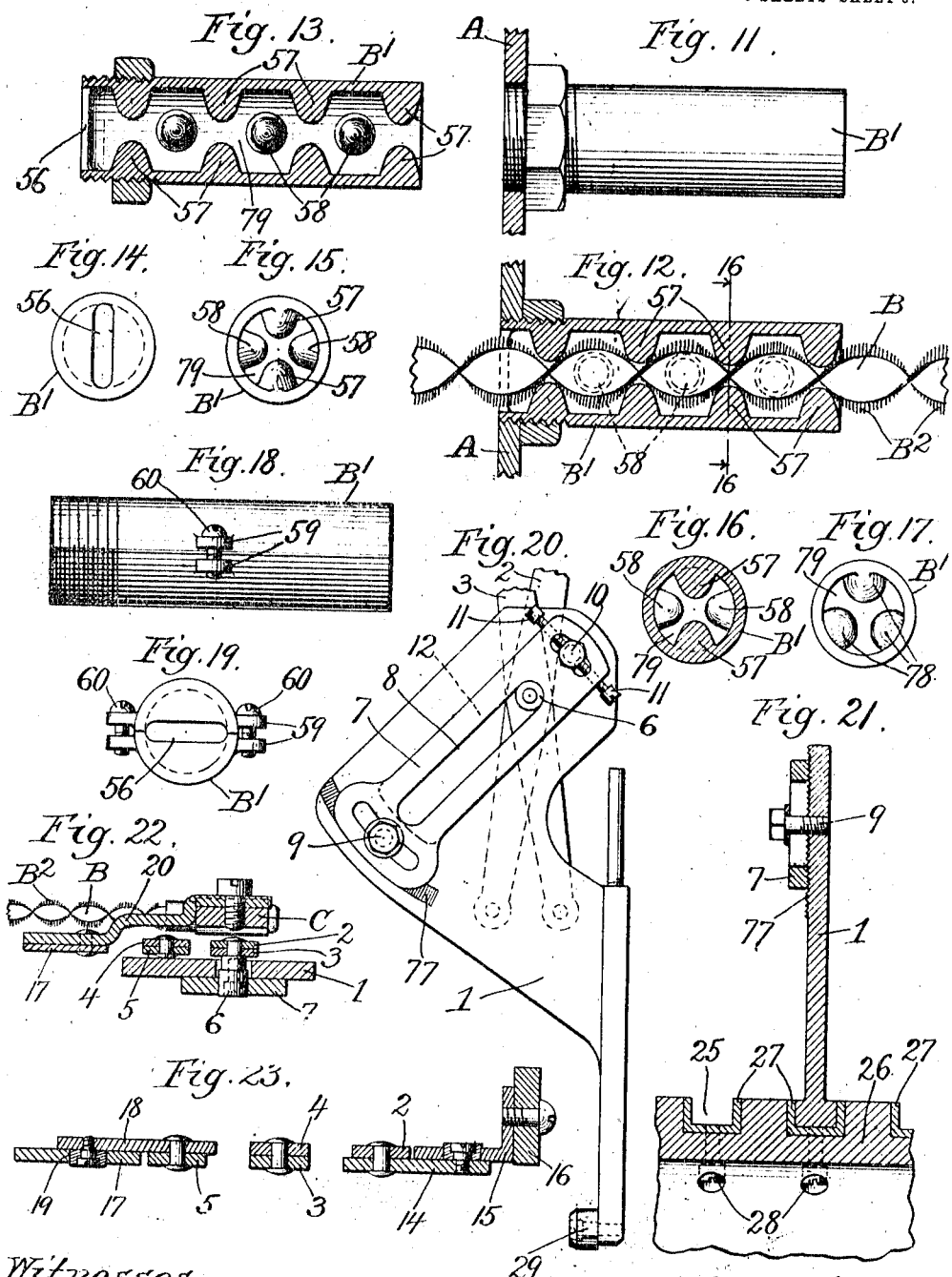

NATHANIEL BOWDITCH, OF AURORA, ILLINOIS.

COTTON-PICKING MACHINE.

1,119,797. Specification of Letters Patent. Patented Dec. 8, 1914.

Application filed August 23, 1906. Serial No. 331,750.

*To all whom it may concern:*

Be it known that I, NATHANIEL BOWDITCH, a citizen of the United States, residing at Aurora, in the county of Kane and State of Illinois, have invented a certain new and useful Improvement in Cotton-Picking Machines, of which the following is a specification.

My invention relates to cotton picking machines and has for its object to provide a new and improved machine of this description.

My invention is illustrated in the accompanying drawings, wherein—

Figure 1 is a plan view of a cotton picking machine embodying my invention; Fig. 2 is a sectional view taken on line 2—2 of Fig. 1; Fig. 3 is an enlarged sectional view taken on line 3—3 of Fig. 2; Fig. 4 is a side elevation of one of the picking wheels with parts broken away; Fig. 5 is a sectional view through one of the picking wheels; Fig. 6 is a sectional view taken on line 6—6 of Fig. 5; Fig. 7 is a view showing one of the cam devices associated with the picking wheel; Fig. 8 is a view similar to Fig. 7 as seen from the opposite side, parts being omitted; Fig. 9 is a sectional view taken on line 9—9 of Fig. 7; Fig. 10 is a sectional view on line 10—10 of Fig. 9; Fig. 11 is a view of one of the guiding devices for the pickers; Fig. 12 is a sectional view through said guiding device showing the picker in position; Fig. 13 is a sectional view through the guiding device with the picker removed; Figs. 14 and 15 are end views of the picker guiding device; Fig. 16 is a sectional view taken on line 16—16 of Fig. 12; Fig. 17 is an end view showing a modified construction of the guiding device; Fig. 18 is a view of the picker guiding device showing a modified construction; Fig. 19 is an end view of the guiding device shown in Fig. 18; Fig. 20 is a view of one of the picker actuating parts; Fig. 21 is a sectional view taken on line 21—21 of Fig. 5; Fig. 22 is a sectional view taken on line 22—22 of Fig. 5; Fig. 23 is a sectional view taken on line 23—23 of Fig. 5; Fig. 24 is a sectional view taken on line 24—24 of Fig. 5.

Like letters refer to like parts throughout the several figures.

In carrying out my invention I provide two picker wheels A revolubly mounted upon a suitable axle $A^1$. These picker wheels are provided with a series of pickers B preferably spiral in form and which pass through guiding devices $B^1$ fastened in some suitable manner to the wheel. These pickers are connected to picker bars C which are mounted upon guiding supports $C^1$ and which are adapted to be moved back and forth along these guiding supports, so as to move the spiral pickers longitudinally back and forth through the guiding devices $B^1$, said guiding devices preferably being arranged so as to make the pickers rotate. Any suitable construction for this purpose may be used. A suitable actuating mechanism is provided for actuating the pickers and the picker bars. As herein shown there are provided a series of actuating pieces 1. These actuating pieces are preferably arranged radially about the axle of the wheel and some suitable means is provided for moving them to and from the axle. The actuating pieces 1 are connected to the picker bars by some suitable mechanism which is preferably a multiplying mechanism so as to multiply the motion. As herein shown the actuating pieces 1 are connected to the picker bars by intervening mechanism which in this instance is shown as a toggle joint connection. This connection is such that there can be relative movement between the toggle joints and the actuating pieces 1. As illustrated the connection consists of a series of pivoted members 2, 3, 4 and 5. Each actuating piece 1 is connected with the associated pivoted members 2, 3, 4 and 5 in any suitable manner, as by means of the connection 6 which in the present instance is shown as a roller.

In order to provide means for adjusting the throw of the pickers, that is for varying the distance they are thrust into the cotton plants, an adjustable connecting piece 7 is attached to each actuating piece 1, and is provided with a slot 8 into which the connection 6 is received. The adjustable connecting piece 7 is provided at each end with a slot, and is adjustably held in place by bolts 9 and 10 passing through said slots. One end is also provided with the adjusting bolts 11 which engage the bolt 10 and permit lateral adjustment. It will be seen that by this means the inclination of the adjustable connecting piece can be varied by loosening the bolts so as to vary the throw of the picker bars. The actuating pieces 1 are provided with enlarged slots 12 through which the connections 6 pass, said slots being enlarged as shown so as to permit the adjustment of the adjustable connecting pieces 7. O of the pivoted members 3 is pivotally connected to a holding part 13 mounted upon one of the guiding supports C¹, and normally fastened thereto. The pivoted member 2 is pivotally connected to a movable holding piece 14 which is provided with rollers working in a slot in a fixed holding piece 15 attached to the support 16 between the hub and rim of the wheel. The two pivoted members 4 and 5 are pivotally connected with the end piece 17. The pivoted member 5 is movably connected with said end piece as by being connected to the supporting piece 18 provided with rollers or projections which work in a slot 19 in the end piece. The end piece 17 is connected to the picker bar C by the connecting arm 20 (see Figs. 5 and 22). It will be seen that with this construction when the actuating pieces are moved toward the periphery of the wheel the connection 6 associated with each actuating piece will be moved along the slots 8, and the end pieces 17 and picker bars C will be forced toward the inner face of the wheel so as to thrust the pickers through the guides and into the cotton plants, as shown at the bottom of Fig. 5. The actuating pieces 1 are received in grooves 25 in a disk 26 which forms a part of the hub of the wheel. These grooves are preferably lined with a metallic lining 27 held in place by screws 28. The actuating pieces are each provided with engaging parts 29 which, as herein shown, consist of rollers. These engaging parts or rollers engage a cam device 30 which is fixed to the axle A¹ in any suitable manner. When the machine is in gear the engaging parts are in contact with the operative part 31 of the cam device. This operative part of the cam device is shaped as shown in Figs. 6 and 7. It will be noted that a portion 32 of the surface of this operative part is concentric with the axle, and that a portion of it is not concentric and runs to a point 33. When the rollers are in engagement with the portion 32 there is no longitudinal movement of the actuating pieces 1. When they reach the point 34 where the said operative part begins to depart from the concentric path, longitudinal movement begins, and this longitudinal movement reaches its maximum when the rollers reach the point 33. It will be noted that the longitudinal or radial movement of the actuating pieces is held back or delayed until the pickers come into proper relation to the cotton, and then the actuating pieces are given a rapid longitudinal or radial movement so as to rapidly thrust the pickers into the cotton causing a rapid rotation thereof, and a winding of the cotton about the pickers, the cotton being engaged by the picker points B² associated with the spiral pickers B. When the rollers pass the point 33 the actuating pieces are moved toward the hub of the wheel so as to withdraw the pickers into the wheel, the first part of the movement being rapid. When the rollers reach the point 35 the withdrawal is retarded or stopped, the pickers partly protruding from the wheel. When the rollers reach the point 36 where the pickers are in position to discharge the cotton, the rollers move rapidly down to the concentric portion of the operative part of the cam device, thus quickly withdrawing the remainder of the pickers into the wheel so as to wipe off the cotton. When the engaging parts or rollers 29 are on the operative part of the cam device they are held in contact therewith or in proper relation thereto by the confining device 37 associated with the cam device. This confining device is integral with the sleeve 41 and has a removable part 38. When this part is removed the rollers and actuating pieces can be removed from the cam device by being pulled longitudinally toward the periphery of the wheel. The outer ends of these actuating pieces work in guiding or confining devices 39.

When it is desired to throw the cotton pickers out of gear the cam device 30 is moved to the right (see Fig. 5) until the rollers 29 are moved out of contact with the operative part 31 of the cam device, and into contact with the inoperative part 40 thereof. The inoperative part 40 is concentric with the axle throughout its circumference, and hence there will be no longitudinal movement of the actuating pieces 1 when the rollers are in this position. The cam device 30 is mounted upon the sleeve 41 fixed to the axle. Associated with this sleeve is a rack 42. A pinion 43 is mounted upon a shaft carried by the cam device 30 and engages the rack 42. The shaft of this pinion is arranged so that it may be engaged by a suitable tool and rotated, its engagement with the rack moving the cam device along the sleeve 41 so as to move the operative part 31 of the cam device out from under the engaging parts 29, so that said engaging parts will be opposite the inoperative part 40 in order to throw the machine out of gear.

In order to throw the machine into gear the pinion 43 is rotated in the same direction so as to move the cam device 30 farther to the right (Fig. 5). To the left of the inoperative part 40 of the cam device is a part 50 which is similar in size and shape to the operative part of the cam device, and may be termed a re-arranging device for the actuating pieces. This part 50 is provided with a projection 44 similar and opposed to the high point 33 of the operative part of the cam device. This projection is cut away or undercut so as to provide a groove 45 (see Figs. 5, 7, 8 and 9) so that when the cam device is moved to the right the ends of the rollers opposite the projection 44 will enter this groove, and thus permit this motion. This will be seen by referring to Fig. 9, where the rollers 46 and 47 and 48 are opposite the projection 44 when the cam device is moved to throw the parts in gear, and it will be seen that they have entered this groove. The following rollers, however, do not enter the groove, but climb up on the projection 44, as illustrated in Fig. 9, for they engage the beveled face 49 (see Figs. 7 and 9). The groove 45 inclines so that it grows deeper toward the right (Fig. 9), that is, toward the point where the rollers pass out of it. This is also shown in Fig. 7. It will thus be seen that when the cam device 30 is thus moved to the right to throw the device in gear, all the rollers except the ones that are at that time opposite the projection 44 will ride up on said point, and when they pass down on the other side will be up on the part 50. It will thus be seen that there are, as it were, two paths for the rollers or engaging parts 29 associated with the actuating pieces, and means provided for diverting said engaging parts from one path to the other. The rollers beyond the slot 45 and projection 44 engage the beveled face 51, said rollers being preferably beveled at the ends, as shown in Fig. 5, and they are gradually forced up on the part 50. The wheel is of course rotated during this operation. When the rollers 46, 47, and 48 pass out of the slot they engage the beveled or inclined face 51 and thus ride up on the part 50. During this operation the cam device 30 is being moved toward the right until the rollers are completely on the part 50. It will thus be seen that the rollers are then in their operative position, that is, the same position they are in when on the operative part 31 of the cam device. The cam device is now moved to the left, and the operative part 31 is thus moved into engagement with the rollers and the device is then in gear and ready to operate. During the period of the transfer, as it were, of the rollers from the part 50 to the operative part of the cam, there can be no displacement of the rollers because the ones under the influence of gravity are at all times in engagement with a concentric portion which prevents their movement, while the ones which might otherwise be displaced are at the bottom of the wheel so that gravity cannot affect them.

In throwing the device into gear the wheel may be moved gradually or the device may be thrown in gear when the machine is running along the ground in the usual way. It will be seen that there is here provided a simple and effective means for throwing the device into and out of gear, and that the device can be thus accurately and completely controlled when the rollers or engaging parts make peripheral contact with the cam device instead of lateral contact or contact at the side, it being more difficult to control the peripheral contact so as to throw the device in and out of gear than when the lateral contact with the cam is made. The sleeve 41 is connected to the axle in any suitable way, but preferably so that it can be moved about the axle so as to vary the position of the cam device in order to adjust the point at which the pickers are thrust out their maximum distance into the cotton. As shown, for example in Fig. 24, this sleeve is held in position by a screw 52 which enters the axle. In order to secure a small adjustment I provide the sleeve with two or more openings 53 for this screw and the axle with two or more openings 54. If, for example, the parts were in the position shown in Fig. 24 and only one screw and one set of holes was used, no fine adjustment could be secured, because the sleeve would have to be moved too far to move it from one hole to the next. By, however, having several holes both in the sleeve and in the axle it will be seen that by moving the screw from one hole to the other any desired amount of adjustment may be secured, and the sleeve may be moved in any desired degree about the axle.

Any suitable guiding device for the picker may be used. As shown in Figs. 11 to 19 I have shown a particular construction of guiding device. Referring to Figs. 11, 12 and 13, the guiding device comprises an outer tube provided at one end with a slot 56, and also provided with internal projections 57 58 which extend only part way across the tube. These projections are preferably arranged opposite each other, as shown, for example, in Fig. 13, thus leaving a space between them, and they are also placed in different angular relations as, for example, the projections 58 being in different alinement from the projections 57. The spiral picker passes between these projections, and they engage the spiral part thereof, and cause the picker to be rotated when it is moved longitudinally. These projections are preferably provided with rounded ends, and may even be spherical in shape if desired. The angular relations of the projections are, of course, dependent upon their distance apart, and the pitch of the spiral, said projections being arranged so that they properly engage the spiral. If, for example, the distance between each set of projections 57 and 58 is equal to one-fourth the pitch of the spiral, said sets of projections will be at right angles to each other. In Figs. 11 to 17 the tube and the projections are integral, and may be all cast in a single piece. In Figs. 18 and 19 the tube containing the projections is made in two pieces, the projections associated with each piece being integral therewith. These pieces are fastened together in any desired manner, as, for example, by means of the lugs 59 and the screws 60.

The machine is pulled along the field straddling a row of cotton, that is, the wheels A are one on each side of the row of cotton. The pickers by means of the mechanism hereinbefore described are projected into the cotton plants, and are simultaneously rotated so as to wrap the cotton thereabout and pull it from the bolls, and they are then withdrawn partially into the wheel until they reach a point near the vertical, and are then completely drawn within the wheel so as to wipe off the cotton. The cotton then falls into the hopper 61, and is then engaged by the carrier 62 and deposited in the receptacle 63. This carrier is driven from the axle by means of the sprocket-wheel 67 and chain 68. If the cotton is very thick, or if a large number of the bolls are open at the time the machine is in use, the quantity of cotton picked will be large and hence it may be necessary to provide some means for positively delivering the cotton to the carrier 62, instead of relying upon its falling into the hopper 61. In such event I may provide a conveyer 64, one associated with each wheel and located in proximity to the hopper 61. This conveyer may be of any suitable construction, and I have illustrated an endless conveyer placed in the path of the cotton and adapted to engage it as the wheel rotates and positively deliver it to the hopper 61. This conveyer is illustrated in Figs. 1, 2 and 3, wherein it will be noted that the conveyers 64 are mounted upon pulleys 65 carried by shafts supported upon the support 66. These conveyers are driven in any desired manner. As herein shown, there is mounted on the support 66 a shaft 69 which is driven from the axle by means of a sprocket-wheel 70 and a chain 71. The shaft 69 is provided with driving wheels 72 which are connected by suitable belts 73 and 74 with the driving wheels 75 and 76. Since the portion of the conveyer next to the wheel must move downwardly, one of the belts will have to be crossed, since they are both driven from the same shaft. It will be seen that by this construction the cotton is engaged by the conveyers and positively carried to the hopper, and hence there can be no spilling of the cotton or clogging up of the machine because of the abundance of cotton picked.

The actuating pieces 1 and the connecting pieces 7 are preferably provided at one end with coacting teeth 77 which engage each other so as to help hold the parts in any desired position, and to permit of a finer adjustment than could otherwise be secured. These coacting teeth are shown clearly in Figs. 20 and 21. The picker points $B^2$ associated with the spiral pickers are made of some flexible material, such, for example, as hair, wire or the like. By using guides with the projections as herein shown, the projections alone engage the picker leaving free spaces 79 for the picker points, so that the picker points do not engage any part of the guide, and thus do not become worn or otherwise injured or displaced.

In Fig. 17 I have shown a guide wherein three sets of projections 78 are used, these projections being staggered so that no two projections will be opposite. These projections can, of course, be placed at regular or irregular intervals, the only condition being that they always conform to the pitch of the spiral.

I claim:

1. A cotton picking machine comprising a series of spiral cotton pickers, mechanism for moving said pickers back and forth, guides through which a portion of the spiral parts of said pickers are moved, and means for adjusting said mechanism so as to vary the length of the back and forth movement of said pickers.

2. A cotton picking device comprising a series of spiral cotton pickers, guides through which a portion of the spiral parts of said pickers are moved, a series of pivoted members connected with said pickers, an actuating piece connected with said pivoted members, and means for reciprocating said actuating piece.

3. A cotton picking device comprising a series of cotton pickers, guides through which a portion of the spiral parts of said pickers are moved, a series of pivoted members connected with said pickers, an actuating piece connected with said pivoted members, and a cam device for moving said actuating piece at predetermined points so as to cause a reciprocating motion of the pickers.

4. A cotton picking device comprising a rotatable wheel, a series of pickers mounted thereon, a series of guides on the wheel through which the pickers are reciprocated and adapted to produce a rotation of said pickers, a picker bar to which said pickers are connected, a series of pivoted members connected with said bar, an actuating piece connected with said pivoted members, and means for moving said actuating piece so as to cause said pivoted members to move to produce a reciprocation of the pickers.

5. A cotton picking device comprising a rotatable wheel, a series of pickers mounted thereon, a series of guides on the wheel through which the pickers are reciprocated and adapted to produce a rotation of said pickers, a picker bar to which said pickers are connected, a series of pivoted members connected with said bar, an actuating piece connected with said pivoted members, means for moving said actuating piece so as to cause said pivoted members to move to produce a reciprocation of the pickers, and an adjusting device associated with said actuating piece for varying the distance through which the pickers are reciprocated.

6. A cotton picking device comprising a wheel, a series of reciprocating pickers mounted thereon, a bar to which said pickers are connected, a series of pivoted members, the members at one end connected with said picker bar and at the other end with the wheel, an actuating piece connected with said pivoted members, and means for moving said actuating piece.

7. A cotton picking device comprising a wheel, a series of reciprocating pickers mounted thereon, a bar to which said pickers are connected, a series of pivoted members, the members at one end connected with said picker bar and at the other end with the wheel, an actuating piece connected with said pivoted members, and a cam device on the axle of the wheel for moving said actuating piece.

8. A cotton picking device comprising a wheel, a series of spiral cotton pickers mounted thereon, a series of guides through which said spiral pickers are reciprocated, and adapted to cause said pickers to rotate, a series of pivoted members a fixed and a movable part connected with said members so that the movable part can be moved to and from the fixed part, said movable part connected with said pickers, an actuating piece movably connected with said pivoted members, and means for moving said actuating piece at right angles to the direction of motion of said movable part.

9. A cotton picking device comprising a wheel, a series of spiral cotton pickers mounted thereon, a series of guides through which said spiral pickers are reciprocated, and adapted to cause said pickers to rotate, a series of pivoted members a fixed and a movable part connected with said members so that the movable part can be moved to and from the fixed part, said movable part can be moved to and from the fixed part, said movable part connected with said pickers, an actuating piece movably connected with said pivoted members, an engaging part on said actuating piece, and a cam on the wheel adapted to engage said engaging part.

10. A cotton picking device comprising a series of reciprocating pickers, a series of actuating pieces connecting mechanism between said actuating pieces and said pickers, an engaging part associated with each actuating piece, a cam device having a varying diameter with which said engaging parts make peripheral contact so as to be moved by the cam in a direction perpendicular to its axis whereby the pickers may be reciprocated.

11. A cotton picking device comprising a series of reciprocating pickers, a series of actuating pieces connecting mechanism between said actuating pieces and said pickers, an engaging part associated with each actuating piece, a cam device having a varying diameter with which said engaging parts make peripheral contact whereby the pickers may be reciprocated, said engaging parts substantially perpendicular to the axis of said cam and means for throwing said actuating pieces into and out of gear.

12. A cotton picking device comprising a wheel, a series of pickers thereon, a series of actuating pieces operatively connected with said pickers, an engaging part associated with each actuating piece, a cam device having a part provided with two paths for said engaging parts, and means for diverting said engaging parts from one path to the other during the process of throwing the apparatus into gear.

13. A cotton picking device comprising a wheel, a series of cotton pickers thereon, a series of actuating pieces operatively connected with said cotton pickers and provided with engaging parts, a cam device provided with an operative part with which said engaging parts make peripheral contact, and means for moving said cam device and actuating pieces relatively so as to move said operative part out of contact with said engaging parts.

14. A cotton picking device comprising a wheel, a series of cotton pickers thereon, a series of actuating pieces operatively connected with said cotton pickers and provided with engaging parts, a cam device provided with an operative part with which said engaging parts make peripheral contact, said cam device movably mounted on the wheel so that it can be moved to throw the apparatus out of gear, and means for reëstablishing the peripheral contact between said operative part of the cam and said engaging parts to throw the apparatus into gear.

15. A cotton picking device comprising a wheel, a series of cotton pickers mounted on said wheel, a series of actuating pieces operatively connected with said pickers, an engaging part on each of said actuating pieces, a cam device having an operative part engaged by said engaging parts when the apparatus is in gear, an inoperative part on said cam device engaged by said engaging parts when the device is out of gear, and means for moving said engaging parts to their proper operative position with relation to said operative part of the cam device when it is desired to throw the device into gear.

16. A cotton picking device comprising a wheel, a series of cotton pickers mounted thereon, a series of actuating pieces operatively connected with said pickers, a cam device on the axle of the wheel having three parts, one the operative part with which the acuating pieces are in engagement when the device is in operation, another the inoperative part with which the actuating pieces are in engagement when the device is out of gear, and the third, a readjusting part which readjusts the actuating pieces in the process of throwing the machine into gear.

17. A cotton picking device comprising a wheel, a series of cotton pickers thereon, mechanism for thrusting said cotton pickers through the wheel so as to engage the cotton, and drawing them back again so as to release the cotton, a hopper device into which the cotton is received, and a positively acting device extending along the face of the wheel and adapted to positively move the cotton toward the hopper device.

18. A cotton picking device comprising a wheel, a series of cotton pickers mounted thereon, means for forcing the cotton pickers through the wheel into contact with the cotton, and then withdrawing them so as to release the cotton, a conveyer extending along the face of the wheel and adapted to engage the cotton as the wheel rotates, and a receptacle associated with said conveyer into which the cotton is discharged.

19. A cotton picking device comprising a wheel, a series of cotton pickers mounted thereon, mechanism for moving said cotton pickers toward and from the cotton plants, a conveyer located in proximity to the face of said wheel and extending radially therealong and adapted to engage the cotton as the wheel rotates and move it toward the axle of the wheel.

20. A cotton picking device comprising a series of cotton pickers, a series of actuating pieces operatively connected with said pickers, a cam device with which said actuating pieces engage, a pinion rotatably mounted upon said cam device, a rack fixed to the axle whereby the cam device may be moved longitudinally along the axle by rotating said pinion.

21. A cotton picking device comprising a series of cotton pickers, a series of actuating pieces operatively connected with said pickers, a cam device with which said actuating pieces engage, a sleeve surrounding the axle upon which said cam device is carried, a plurality of holes in said sleeve and in said axle arranged so that when one hole in the sleeve registers with a hole in the axle there are one or more other holes in the sleeve and axle which do not register.

22. A cotton picking device comprising a wheel, a series of pickers mounted thereon, a series of actuating pieces operatively connected with said pickers, a cam device surrounding the axle, laterally projecting engaging parts on said actuating pieces which engage said cam device, a confining device surrounding said engaging parts and a portion of said cam device so as to protect the same.

23. A cotton picking device comprising a wheel, a series of pickers mounted thereon, a series of actuating pieces operatively connected with said pickers, a cam device surrounding the axle, laterally projecting engaging parts on said actuating pieces which engage said cam device, a confining device surrounding said engaging parts and a portion of said cam device so as to protect the same, said confining device provided with a removable part which when removed permits the engaging parts to be moved into or withdrawn from engagement with the cam device.

24. A cotton picking device comprising a series of cotton pickers, a picker bar to which they are connected, a series of pivoted members, an end-piece to which two of said pivoted members are connected so that the ends thereof may move relatively, one of said pivoted members being connected with a part fixed on the wheel, said end-piece connected with said picker bar, an actuating piece operatively connected with said pivoted members, and means for moving said actuating piece so as to move the pivoted members.

25. A cotton picking device comprising a series of cotton pickers, a picker bar to which they are connected, a series of pivoted members, an end-piece to which two of said pivoted members are connected so that the ends thereof may move relatively, one of said pivoted members being connected with a part fixed on the wheel, said end-piece connected with said picker bar, an actuating piece associated with said pivoted members, a connection on said pivoted member a slot associated with said actuating piece in which said connection works, and means for reciprocating the actuating piece.

26. A guide for spiral cotton pickers comprising a holding piece, means for preventing longitudinal movement of said holding piece, a series of projections extending inwardly part way through said holding piece so as to leave a free space near the center of the holding piece and adapted to be engaged by the picker.

27. A guide for spiral cotton pickers comprising a holding piece, means for preventing longitudinal movement of said holding piece, a series of projections extending inwardly part way through said holding piece so as to leave a free space near the center of the holding piece, said projections integral with said holding piece and adapted to be engaged by the picker.

28. A guide for spiral cotton pickers comprising a holding piece, means for preventing longitudinal movement of said holding piece, a series of projections extending inwardly part way through said holding piece so as to leave a free space near the center of the holding piece, said projections provided with rounded ends which engage the spiral of the picker.

29. A guide for spiral cotton pickers comprising a tube, means for fixing it against longitudinal movement, a series of projections extending inwardly toward the center of said tube, the tube and projections forming a single integral piece.

30. A guide for spiral cotton pickers comprising an inclosing device through which the picker passes, means for fixing it against longitudinal movement, a series of projections associated with said inclosing device and projecting inwardly, and with which the picker engages the ends of said projections located at one side of the center line, said projections arranged so that there is a space at the center of the inclosing device through which the picker passes.

31. The combination with a spiral cotton picker having projecting picker points of a guide comprising an inclosing device, a series of projections associated therewith and extending inwardly and adapted to engage the spiral of the picker, the projections being separate from each other so that the picker points may pass between them without engagement therewith.

32. The combination with a spiral cotton picker of a guide comprising an inclosing device, a series of independent projections extending into and part way through the inclosing device and adapted to engage the spiral of the picker, said projections so disposed that when the picker is moved in the direction of its length through the guide it will be rotated about its axis.

33. A cotton picking machine comprising a series of cotton pickers, mechanism for moving said pickers back and forth, guides through which said pickers are moved, and which cause them to rotate, and means for adjusting said mechanism so as to vary the length of the back and forth movement of said pickers.

34. A cotton picking device comprising a series of cotton pickers, a series of picker bars to which said pickers are connected, and a rod intermediate the ends of said picker bars and along which said picker bars slide, an actuating mechanism connected with said bars so as to move them and a separate connection between said actuating mechanism and said rod.

35. A cotton picking device comprising a wheel, a series of guides connected therewith, a series of cotton pickers engaging said guides, a series of picker bars with which said cotton pickers are connected, rods intermediate the ends of said bars and upon which said bars slide, and means for sliding said bars on said rods, an actuating mechanism connected with said bars so as to move them and a separate connection between said actuating mechanism and said rod.

36. A cotton picking device comprising a series of cotton pickers, a picker bar to which they are connected, two or more pivoted members, an end piece to which two of said pivoted members are connected so that the ends thereof may move near together as the end pieces move in one direction and may spread apart as the end pieces move in the other direction, a connection between said end piece and said picker bar and a connection between said pivoted members and a fixed part.

37. A cotton picking device comprising two or more pivoted members, an end piece to which two of said pivoted members are connected so that the ends thereof may move near together as the end piece moves in one direction and may spread apart as the end piece moves in the other direction, a connection between said pivoted members and a fixed part and one or more cotton pickers connected with said end piece so as to move therewith.

NATHANIEL BOWDITCH.

Witnesses:
 EDWARD T. WRAY,
 EDNA K. REYNOLDS.